(12) United States Patent
Fu et al.

(10) Patent No.: US 11,828,993 B2
(45) Date of Patent: Nov. 28, 2023

(54) OPTICAL SUB-MODULE AND OPTICAL MODULE

(71) Applicant: HISENSE BROADBAND MULTIMEDIA TECHNOLOGIES CO., LTD., Shandong (CN)

(72) Inventors: Mengbo Fu, Shandong (CN); Yifan Xie, Shandong (CN); Qinhao Fu, Shandong (CN)

(73) Assignee: HISENSE BROADBAND MULTIMEDIA TECHNOLOGIES CO., LTD., Shandong (CN)

( * ) Notice: Subject to any disclaimer, the term of this patent is extended or adjusted under 35 U.S.C. 154(b) by 506 days.

(21) Appl. No.: 17/162,173

(22) Filed: Jan. 29, 2021

(65) Prior Publication Data

US 2021/0157073 A1    May 27, 2021

Related U.S. Application Data

(63) Continuation-in-part of application No. PCT/CN2019/126061, filed on Dec. 17, 2019.

(30) Foreign Application Priority Data

Dec. 17, 2018  (CN) .......................... 201811540334.2
Dec. 17, 2018  (CN) .......................... 201811543875.0

(51) Int. Cl.
*H05K 5/00*        (2006.01)
*G02B 6/42*        (2006.01)
(Continued)

(52) U.S. Cl.
CPC ............ *G02B 6/4256* (2013.01); *H04B 10/50* (2013.01); *H04B 10/60* (2013.01)

(58) Field of Classification Search
USPC .................. 361/807, 728, 752, 796, 800
See application file for complete search history.

(56) References Cited

U.S. PATENT DOCUMENTS 5,981,945 A    11/1999  Spaeth et al.
6,502,999 B1    1/2003  Cohen et al.
(Continued)

FOREIGN PATENT DOCUMENTS

CN         1135660 A    11/1996
CN       202305918 U     7/2012
(Continued)

OTHER PUBLICATIONS

International Search Report and Written Opinion issued in corresponding International Application No. PCT/CN2019/126061 dated Mar. 19, 2020, with English translation.
(Continued)

*Primary Examiner* — Hung S. Bui
(74) *Attorney, Agent, or Firm* — Morgan, Lewis & Bockius LLP

(57) ABSTRACT

An optical sub-module includes a first casing, a second casing, an adhesive layer and an optical device. The first casing has a top wall and a first sidewall. The second casing has a bottom wall and a second sidewall. A height of the second sidewall in a thickness direction of the bottom wall is greater than a height of the first sidewall in a thickness direction of the top wall, and the second casing and the first casing is connected to form a chamber. The adhesive layer is disposed between a surface of the first sidewall and a surface of the second sidewall, and a coefficient of thermal expansion of the adhesive layer is greater than a coefficient of thermal expansion of the first casing and a coefficient of
(Continued)

thermal expansion of the second casing. The optical device is disposed in the chamber and fixedly connected to the second casing.

19 Claims, 13 Drawing Sheets

(51) Int. Cl.
 *H04B 10/50* (2013.01)
 *H04B 10/60* (2013.01)

(56) References Cited

U.S. PATENT DOCUMENTS

| | | | |
|---|---|---|---|
| 6,571,048 B1 | 5/2003 | Bechamps et al. | |
| 10,952,355 B1* | 3/2021 | Hocker | H05K 5/0247 |
| 2003/0044128 A1* | 3/2003 | Crane, Jr. | G02B 6/4201 |
| | | | 385/92 |
| 2012/0033695 A1* | 2/2012 | Hayashi | H01S 5/0232 |
| | | | 372/43.01 |
| 2020/0355985 A1* | 11/2020 | Jung | H04N 23/60 |

FOREIGN PATENT DOCUMENTS

| | | | | |
|---|---|---|---|---|
| CN | 104020536 A | 9/2014 | | |
| CN | 104459907 A | 3/2015 | | |
| CN | 107219596 A | 9/2017 | | |
| CN | 107993984 A | 5/2018 | | |
| CN | 108196345 A | 6/2018 | | |
| CN | 109407233 A | 3/2019 | | |
| CN | 109407235 A | 3/2019 | | |
| JP | 2004-146630 A | 5/2004 | | |
| JP | 2020052307 | * | 4/2020 | G02B 6/42 |

OTHER PUBLICATIONS

First Office Action issued in corresponding Chinese Patent Application No. 201811540334.2 dated Jan. 3, 2020, with English translation.

* cited by examiner

OPTICAL SUB-MODULE AND OPTICAL MODULE

CROSS-REFERENCE TO RELATED APPLICATIONS

This application is a Bypass Continuation-in-Part application of PCT/CN2019/126061 filed on Dec. 17, 2019, which claims priorities to Chinese Patent Applications No. 201811540334.2 filed on Dec. 17, 2018, and No. 201811543875.0 filed on Dec. 17, 2018, and the entirety of each is incorporated herein by reference.

TECHNICAL FIELD

The present disclosure relates to the field of optical communication, and in particular, to an optical sub-module and an optical module.

BACKGROUND

An optical module generally refers to an integrated module for photoelectric conversion. The optical module can convert an optical signal into an electrical signal, or convert an electrical signal into an optical signal, and thus plays an important role in the field of optical communication.

SUMMARY

In an aspect, some embodiments of the present disclosure provide an optical sub-module. The optical sub-module includes a first casing, a second casing, an adhesive layer and an optical device. The first casing has a top wall and a first sidewall. The second casing has a bottom wall and a second sidewall. A height of the second sidewall in a thickness direction of the bottom wall is greater than a height of the first sidewall in a thickness direction of the top wall, and the second casing and the first casing is connected to form a chamber. The adhesive layer is disposed between a surface of the first sidewall and a surface of the second sidewall, and a coefficient of thermal expansion of the adhesive layer is greater than a coefficient of thermal expansion of the first casing and a coefficient of thermal expansion of the second casing. The optical device is disposed in the chamber and fixedly connected to the second casing.

In another aspect, the embodiments of the present disclosure provide an optical module including the optical sub-module, and the optical sub-module is electrically connected to the circuit board.

In another aspect, the embodiments of the present disclosure provide an optical sub-module. The optical sub-module includes a first casing having a top wall and a first sidewall extending from the top wall. A second casing of the optical sub-module has a bottom wall and a second sidewall extending from the bottom wall. An adhesive layer is disposed between a portion of the first sidewall and a portion of the second sidewall and spaced apart from the top wall of the first casing. The optical sub-module further includes an optical device disposed on the second casing and spaced apart from the top wall.

BRIEF DESCRIPTION OF THE DRAWINGS

In order to describe technical solutions in the embodiments of the present disclosure more clearly, accompanying drawings to be used in some embodiments of the present disclosure will be introduced briefly. However, the accompanying drawings to be described below are merely accompanying drawings of some embodiments of the present disclosure, and a person of ordinary skill in the art may obtain other drawings according to these drawings.

DETAILED DESCRIPTION

Figure 1:
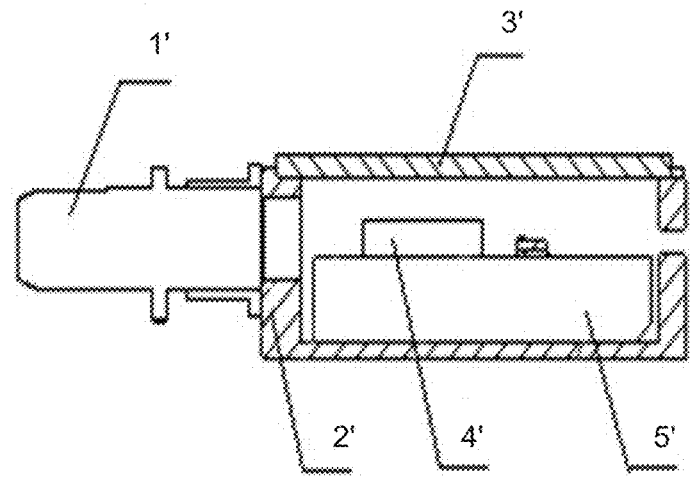
FIG. 1 is a schematic diagram showing an optical sub-module.

Technical solutions in some embodiments of the present disclosure will be described clearly and completely in combination with accompanying drawings in some embodiments of the present disclosure. However, the described embodiments are merely some but not all of embodiments of the present disclosure. All other embodiments made on a basis of the some embodiments of the present disclosure by a person of ordinary skill in the art shall be included in the protection scope of the present disclosure.

Unless the context requires otherwise, in the description and the claims, terms "comprise" and other forms thereof such as the third-person singular form "comprises" and the present participle form "comprising" are construed as open and inclusive, i.e., "included, but not limited to". In the description of the specification, terms "one embodiment", "some embodiments", "exemplary embodiments", "example", "specific example" or "some examples" are intended to indicate that specific features, structures, materials, or characteristics related to the embodiment(s) or the example(s) are included in at least one embodiment or example of the present disclosure. Schematic representations of the above terms do not necessarily refer to same embodiment(s) or example(s). In addition, the specific features, structures, materials, or characteristics may be included in any or more embodiments or examples in any suitable manner.

Terms such as "first" and "second" are used for descriptive purposes only, and are not to be construed as indicating or implying relative importance or implicitly indicating the number of indicated technical features below. Therefore, features defined by "first" or "second" may explicitly or implicitly include one or more of the features. In the description of the some embodiments of the present disclosure, the term "plurality" means two or more unless otherwise specified.

Some embodiments may be described using the expression "coupled" and "connected" along with their derivatives. For example, some embodiments may be described using the terms "coupled" and "connected" to indicate that two or more components are in direct physical or electrical contact with each other. However, the terms "coupled" and "connected" may also mean that two or more components are not in direct contact with each other, but still cooperate or interact with each other through intermediate. The embodiments disclosed herein are not necessarily limited to this contents.

In addition, "A and/or B" refers to the following three situations: A alone, A and B, and B alone.

In the field of optical communication, optical signals are used to carry information to be transmitted. The optical signals can be transmitted in optical waveguides such as an optical fiber without the power supply, which may realize low cost and low loss information transmission. However, in the information processing devices such as a computer, electrical signals are used to transmit information, and thus there is a need to realize a mutual conversion between the electrical signals and the optical signals.

Figure 11:
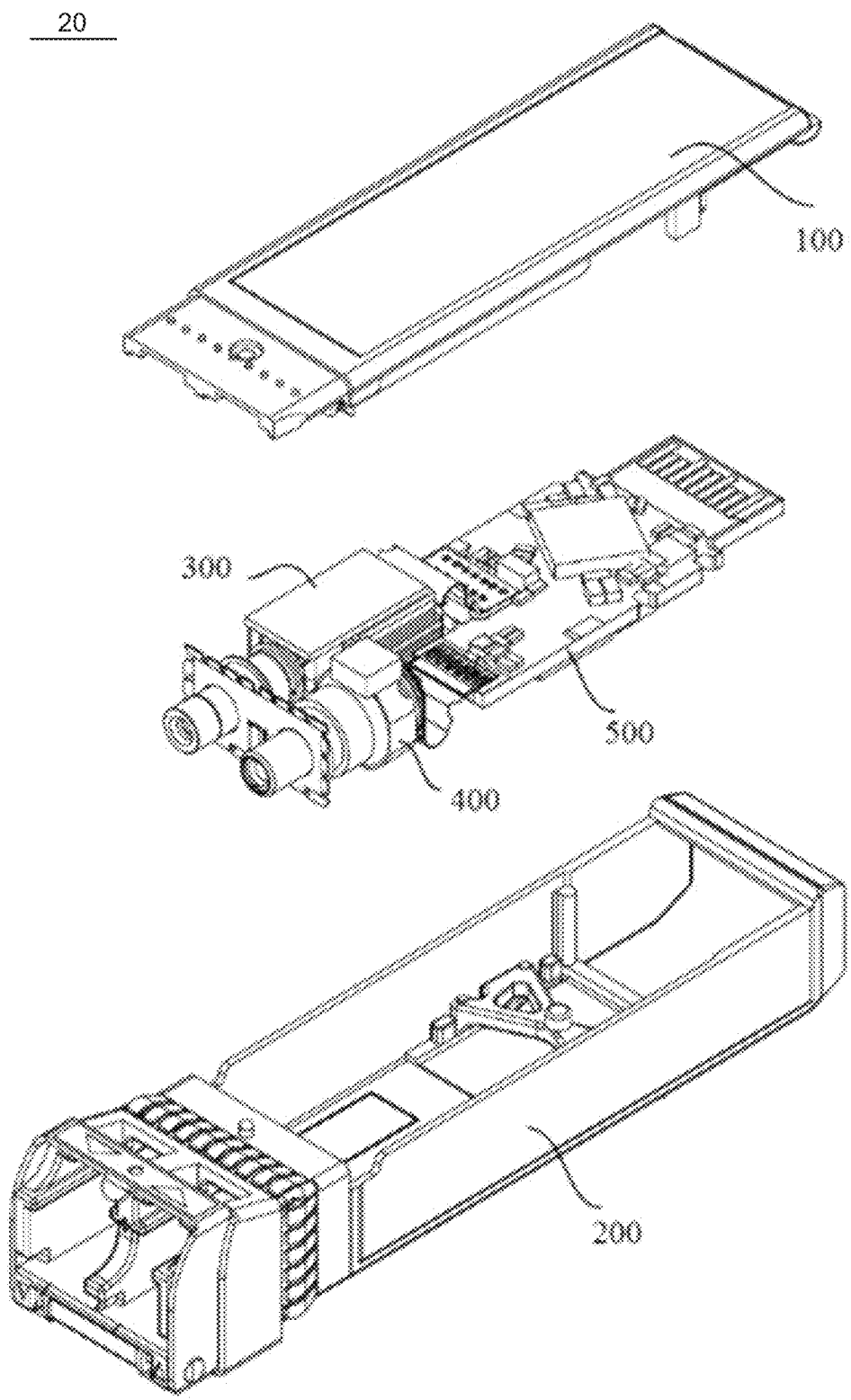
FIG. 11 is a partially exploded diagram of an optical module, in accordance with some embodiments of the present disclosure.

Some embodiments of the present disclosure provide an optical module. The optical module is a device for signal conversions between the optical signals and the electrical signals. Referring to FIG. 11, the optical module 20 includes an optical sub-module 300 and a circuit board 500 electrically connected to the optical sub-module 300.

The circuit board 500 is connected to an external host computer to realize power supply and electrical signal transmission, and the optical sub-module 300 is connected to optical transmission mediums such as external optical fibers to realize optical transmission.

The optical sub-module 300 includes at least one of a transmitter optical sub-module, a receiver optical sub-module, or a bi-directional optical sub-module. The transmitter optical sub-module may also be referred to as a transmitter optical sub-assembly (TOSA), and is configured to convert electrical signals into optical signals. The receiver optical sub-module may also be referred to as a receiver optical sub-assembly (ROSA), and is configured to convert optical signals into electrical signals. The bi-directional optical sub-module may also be referred to as a bi-directional optical sub-assembly (BOSA), and is configured to convert electrical signals into optical signals, and convert optical signals into electrical signals. For example, the optical sub-module further includes optical devices such as at least one laser chip and/or at least one optical detector.

Figure 2:
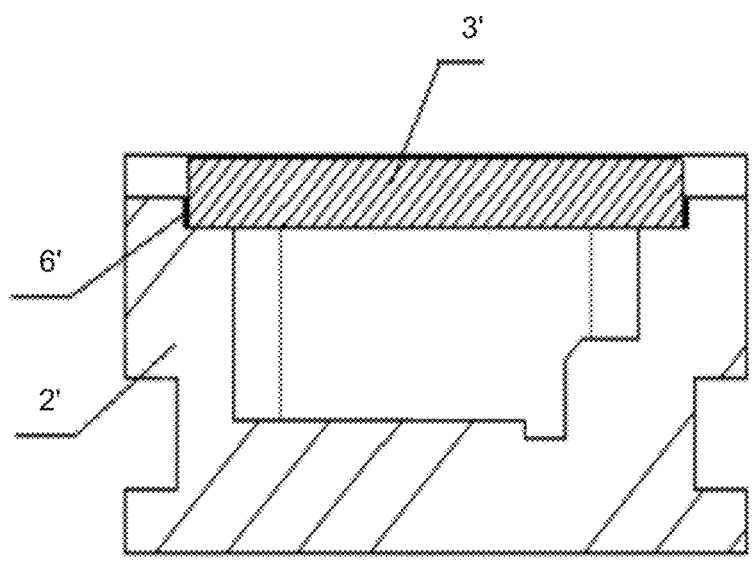
FIG. 2 is a sectional view of the optical sub-module in FIG. 1.

FIG. 1 is a schematic diagram of an optical sub-module, and FIG. 2 is a sectional view of the optical sub-module in FIG. 1. As shown in FIGS. 1 and 2, the optical sub-module includes a cover 3', a shell 2', a metal substrate 5', an optical device 4' and an electrical device 1'. The cover 3' is connected to the shell 2' to form a cavity for receiving components in the optical sub-module. The metal substrate 5' is disposed in the cavity, and the optical device 4' is fixed on the metal substrate 5'. The electrical device 1' is connected to a side wall of the shell 2'. For example, as shown in FIG. 2, the cover 3' is a solid plate-like structure, and the cover 3' and the shell 2' are connected by an adhesive layer 6'.

Figure 3:
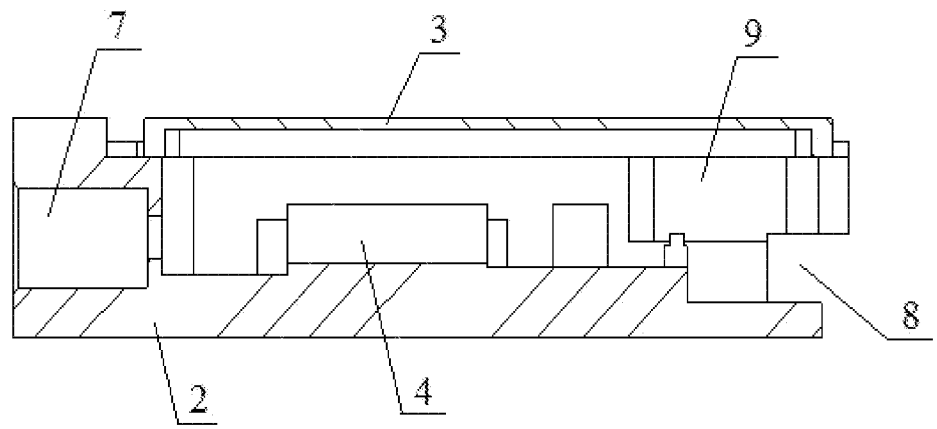
FIG. 3 is a schematic diagram of an optical sub-module, in accordance with some embodiments of the present disclosure.
Figure 4:
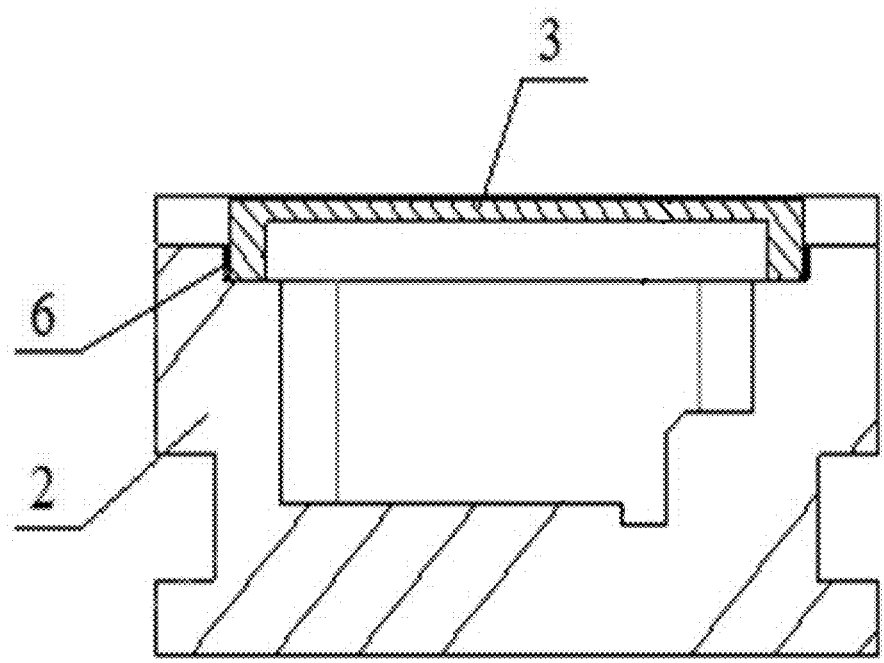
FIG. 4 is a sectional view of an optical sub-module, in accordance with some embodiments of the present disclosure.
Figure 5:
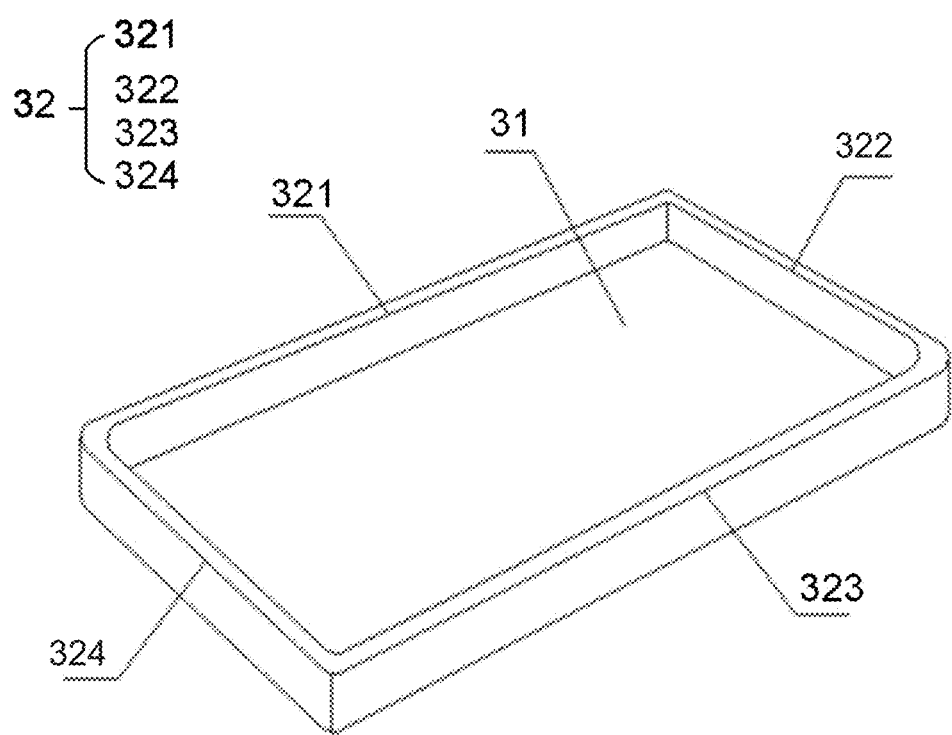
FIG. 5 is a schematic diagram of a first casing, in accordance with some embodiments of the present disclosure.

FIG. 3 is a schematic diagram of an optical sub-module, in accordance with some embodiments, FIG. 4 is a sectional view of the optical sub-module shown in FIG. 3, and FIG. 5 is a schematic diagram of the first casing shown in FIG. 3.

In some embodiments, as shown in FIGS. 3 and 4, the optical sub-module 300 includes a first casing 3, a second casing 2, an optical device 4, and an adhesive layer 6.

Figure 12:
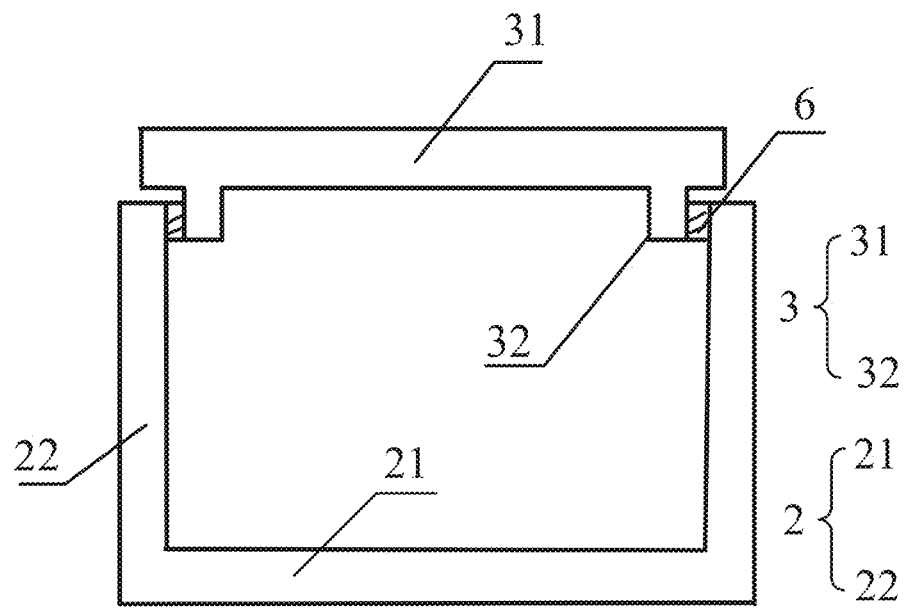
FIG. 12 is a schematic diagram of another optical sub-module, in accordance with some embodiments of the present disclosure.
Figure 14:
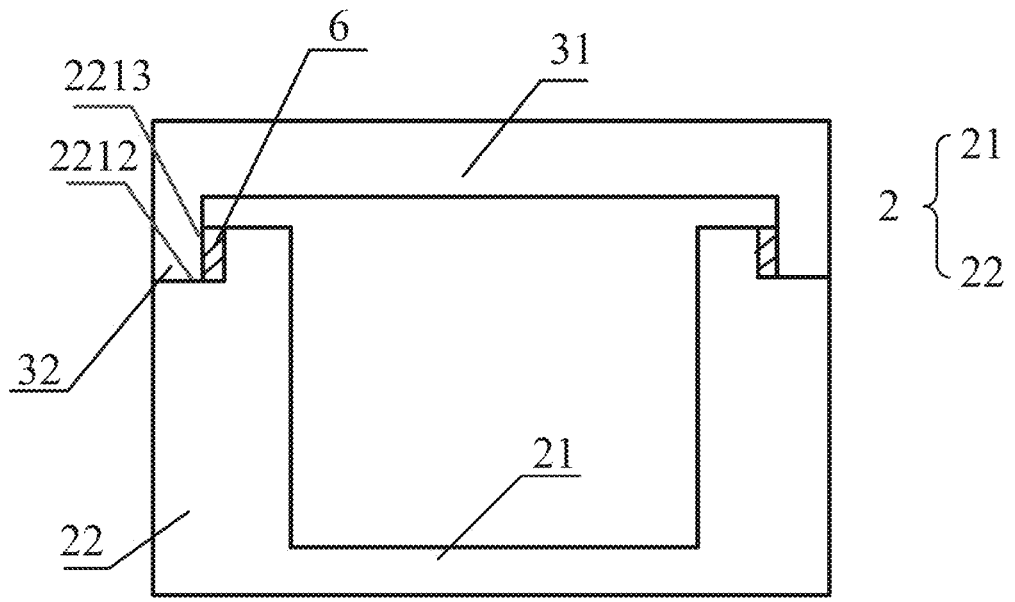
FIG. 14 is a schematic diagram of yet another optical sub-module, in accordance with some embodiments of the present disclosure.

In some embodiments, as shown in FIGS. 5, 12 and 14, the first casing 3 has a top wall 31 and a first sidewall 32. The first sidewall 32 is enclosed in a circumferential direction, so that the first casing 3 has a groove structure.

In some examples, as shown in FIGS. 5, 12 and 14, the top wall 31 is integrally formed with the first sidewall 32. That is, the first casing 3 has a whole structure. In this way, a technological process may be simplified, and the entire first casing 3 may have a high strength.

In this case, the top wall 31 and the first sidewall 32 are made of a same material, such as Kovar alloy.

Figure 6:
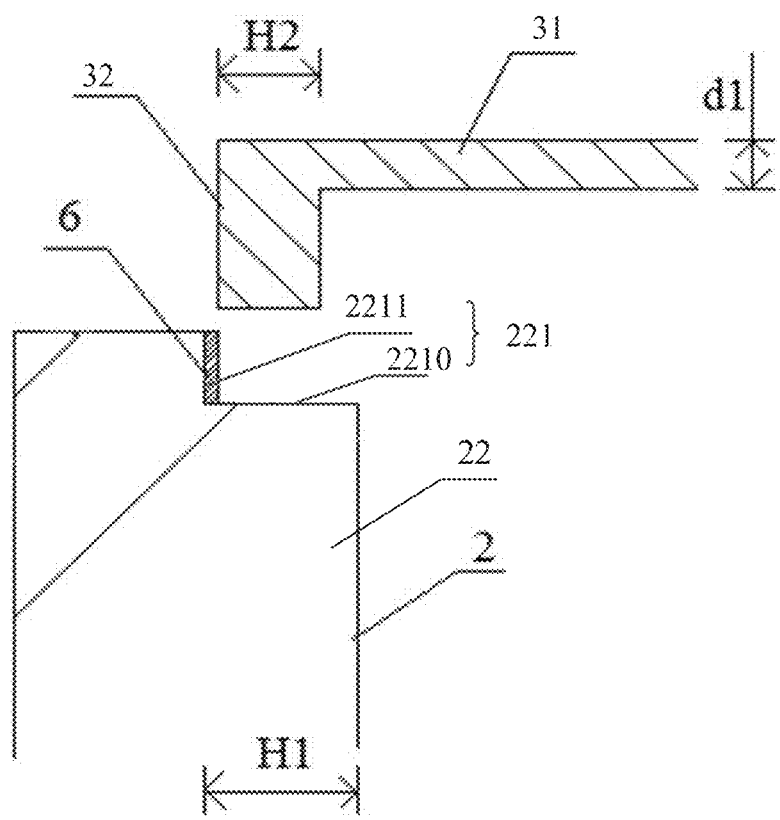
FIG. 6 is a partially exploded diagram of an optical sub-module, in accordance with some embodiments of the present disclosure.

In some other examples, as shown in FIG. 6, the top wall 31 is fixedly connected to the first sidewall 32. For example, the top wall 31 and the first sidewall 32 are fixedly connected by welding.

In this case, the top wall 31 and the first sidewall 32 may be made of different materials. For example, the top wall 31 may be made of a material with a high heat dissipation coefficient, such as tungsten-copper alloy, so as to increase a heat dissipation speed of the optical sub-module, and to prevent high temperature from affecting normal use of the optical device 4. The first sidewall 32 may be made of a material that is easy to weld and process and has a high coefficient of thermal expansion, such as Kovar alloy, which may improve a wear resistance of the first casing 3. In this case, the first casing 3 may not only absorb stress effectively but also dissipate heat better.

It will be noted that there is no limitation for the position of the first sidewall 32 on the top wall 31. For example, as shown in FIGS. 5 and 14, the first sidewall 32 is disposed on an edge of a surface of the top wall 31 facing the second casing 2. Alternatively, as shown in FIG. 12, the first sidewall 32 is disposed on the surface of the top wall 31 facing the second casing 2, and there is a distance between the first sidewall 32 and the edge of the top wall 31.

An orthographic projection of the first sidewall 32 on a plane where the first surface of the top wall 31 facing the second casing 2 is located may have various shapes. For example, the orthographic projection of the first sidewall 32 on the plane may be in a shape of a circular ring, a rectangular ring, or the like.

The term "surface" of a wall herein refers to a surface of the wall perpendicular to a thickness direction of the wall.

Figure 8:
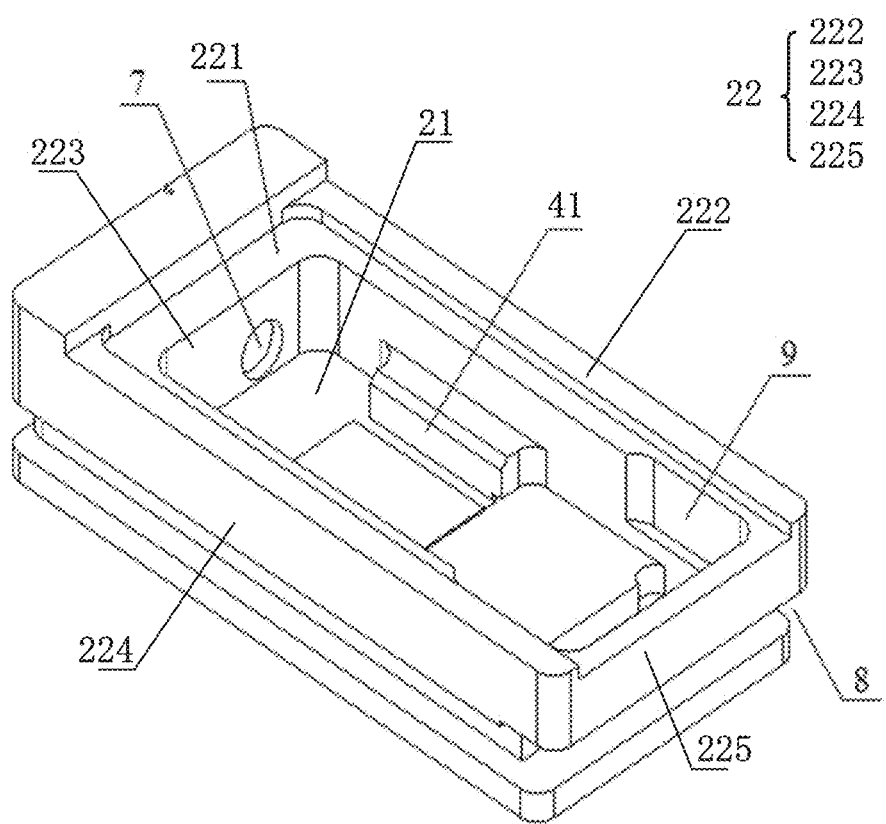
FIG. 8 is an upper perspective view of a second casing, in accordance with some embodiments of the present disclosure.

As shown in FIGS. 3, 4 and 8, the second casing 2 has a bottom wall 21 and a second sidewall 22. The second sidewall 22 is enclosed in a circumferential direction, so that the second casing 2 has a cavity for receiving the optical device 4. With regard to the connection of the bottom wall 21 and the second sidewall 22, reference may be made to the first casing 3.

The first casing 3 and the second casing 2 are connected to form a chamber. In order to cooperate with the first sidewall 32, an orthographic projection of the second sidewall 22 on a plane where a surface of the bottom wall 21 facing the first casing 3 is located has various shapes. For example, the orthographic projection of the second sidewall 22 on the plane may be in a shape of the circular ring, the rectangular ring, or the like.

A height of the second sidewall 22 in a thickness direction of the bottom wall 21 may be greater than a height of the first sidewall 32 in a thickness direction of the top wall 31, so that a depth of the second casing 2 is greater than a depth of the first casing 3. Since in order to seal the first casing 3 and the second casing 2, an area of the bottom wall 21 is basically equal to or greater than an area of the top wall 31, a volume of the second casing 2 is greater than a volume of the first casing 3.

In addition, as shown in FIG. 4, the adhesive layer 6 is disposed between a surface of the first sidewall 32 and a surface of the second sidewall 22 that are opposite to each other, and a coefficient of thermal expansion of the adhesive layer 6 is greater than a coefficient of thermal expansion of the first casing 3 and a coefficient of thermal expansion of the second casing 2.

The coefficient of thermal expansion herein refers to the amount of expansion per unit length of a material resulting from one degree change in temperature.

In this way, when the adhesive layer 6 expands at high temperature, since the coefficient of thermal expansion of the adhesive layer 6 is greater than the coefficient of thermal expansion of the first casing 3 and the coefficient of thermal expansion of the second casing 2, extrusion forces may be generated in all directions and act on the first casing 3 and the second casing 2. The extrusion force in a horizontal direction may deform the second casing 2 and/or the first casing 3. However, since the volume of the first casing 3 is less than the volume of the second casing 2, the first casing 3 is more prone to deform than the second casing 2 after subjected to a force. The deformation of the first casing 3 may provide a space for the expanded adhesive layer 6, thereby reducing a deformation amount of the second casing 2. In addition, since a size of the second casing 2 is greater than a size of the first casing 3, the second casing 2 has a strong ability to resist the extrusion force generated by the expanded adhesive layer 6 and is not prone to deform, thereby reducing an impact on a light path.

In order to make the first casing 3 more prone to deform than the second casing 2, in some examples, the first casing 3 and the second casing 2 are made of materials with different coefficient of thermal expansions, and the coefficient of thermal expansion of the first casing 3 is less than the coefficient of thermal expansion of the second casing 2. For example, the first casing 3 is made of the Kovar alloy, and the second casing 2 is made of the tungsten-copper alloy. Alternatively, the first casing 3 is made of stainless steel, and the second casing 2 is made of the Kovar alloy. In this way, the first casing 3 has a less ability to resist the extrusion force generated by the expanded adhesive layer 6. That is, the first casing 3 is more prone to deform than the second casing 2 when subjected to a same force.

In some other examples, the first casing 3 and the second casing 2 are made of materials with different stiffness, and stiffness of the first casing 3 is less than stiffness of the second casing 2. For example, the first casing 3 is made of the Kovar alloy, and the second casing 2 is made of the tungsten-copper alloy. Alternatively, the first casing 3 is made of the stainless steel, and the second casing 2 is made of the Kovar alloy. In this way, the first casing 3 is more prone to deform than the second casing 2 when subjected to a same force.

The stiffness herein refers to an ability of the material or the structure to resist elastic deformation when a material or a structure is subjected to a force, i.e., a degree of difficulty of elastic deformation of a material or a structure. The unit of the stiffness is Newtons per meter (N/m).

In some other examples, the first casing 3 and the second casing 2 are made of materials with different yield strength, and yield strength of the first casing 3 is less than yield strength of the second casing 2. For example, the first casing 3 is made of the Kovar alloy, and the second casing 2 is made of the tungsten-copper alloy. Alternatively, the first casing 3 is made of the stainless steel, and the second casing 2 is made of the Kovar alloy. In this way, the first casing 3 is more prone to deform than the second casing 2 when subjected to a same force.

The yield strength herein refers to the stress the material is able to resist before the material yields. The unit of the yield strength is Newtons per millimeter squared (N/mm$^2$).

In some examples, the adhesive layer 6 is a waterproof adhesive layer 6. For example, the waterproof adhesive layer 6 may be made of epoxy resin. A coefficient of thermal expansion of the waterproof adhesive layer 6 may be in a range of approximately $30 \times 10^{-6}$/K to approximately $50 \times 10^{-6}$/K. A coefficient of thermal expansion of metal components in the optical module, such as the first casing 3 and the second casing 2, may be in a range of approximately $5 \times 10^{-6}$/K to approximately $6 \times 10^{-6}$/K. In addition, the waterproof adhesive layer 6 may contain quartz crystals each with a diameter of approximately 30 μm.

It will be noted that "approximately" is inclusive of the stated value and means within an acceptable range of deviation for the particular value as determined by one of ordinary skill in the art, considering the measurement in question and the error associated with measurement of the particular quantity (i.e., the limitations of the measurement system). For example, "approximately" can mean within one or more standard deviations, or within ±30%, 20%, 10% or 5% of the stated value.

Figure 17:
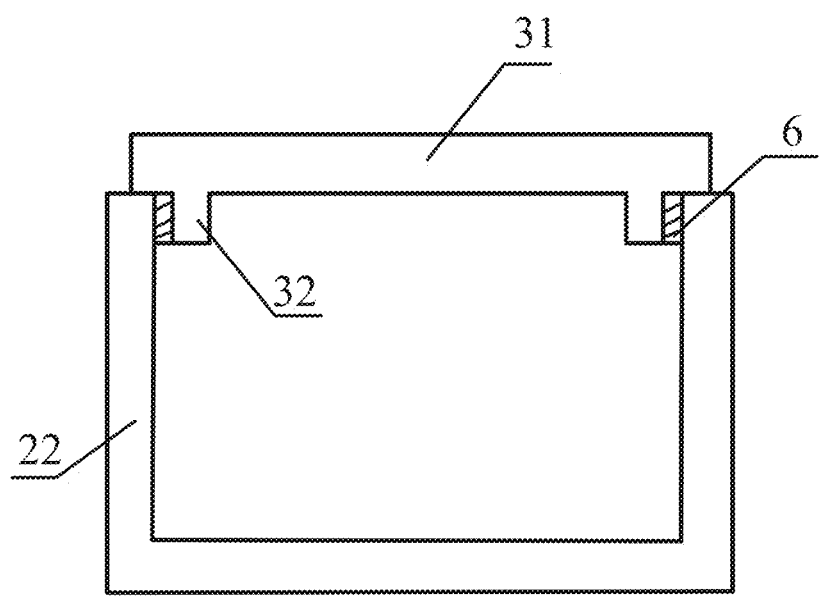
FIG. 17 is a schematic diagram of yet another optical sub-module, in accordance with some embodiments of the present disclosure.

In some examples, as shown in FIGS. 4, 12 and 17, there is a distance between the first sidewall 32 and the edge of the top wall 31, and the adhesive layer 6 is disposed between an outer surface of the first sidewall 32 and an inner surface of the second sidewall 22.

In this case, an encapsulation process of the first casing 3 and the second casing 2 is as follows. The first sidewall 32 is inserted into the cavity of the second casing 2, and the outer surface of the first sidewall 32 and the inner surface of the second sidewall 22 are bonded by the adhesive layer 6. The surface of the second sidewall 22 for bonding and the surface of the second sidewall 22 for supporting the first casing 3 are different surfaces.

Figure 13:
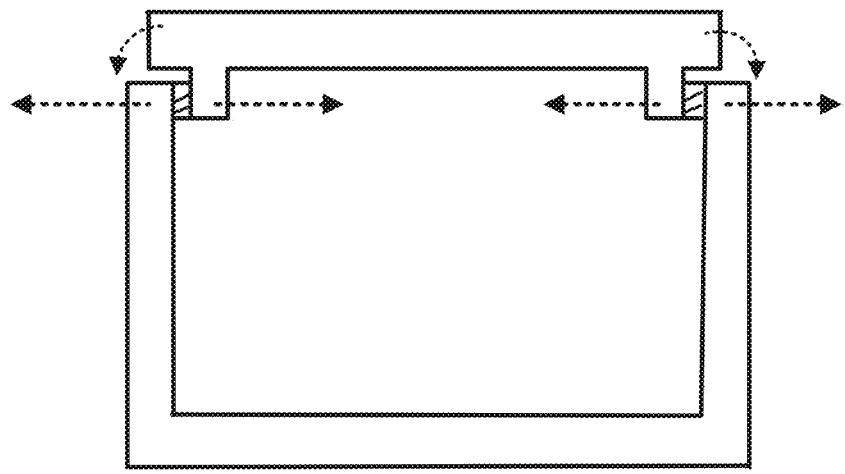
FIG. 13 is a schematic diagram showing forces to which the optical sub-module in FIG. 12 is subjected.

In this way, as shown in FIG. 13, the expanded adhesive layer 6 generates the extrusion forces in all directions. The second sidewall 22 will be subjected to an extrusion force pointing to the outside of the cavity, and the first sidewall 32 will be subjected to an extrusion force pointing to the interior of the cavity. In this case, the first casing 3 is more prone to deform under the extrusion force, and provides a space for the expanded adhesive layer 6 to release the extrusion force, thereby reducing the extrusion force to which the second casing 2 is subjected and reducing the deformation of the second casing 2. As a result, an impact of the deformation of the second casing 2 on a position of the optical device 4 may be weakened, which may be conductive to maintaining a preset optical path, and to solving a problem of a reduction of the optical power.

Figure 18:
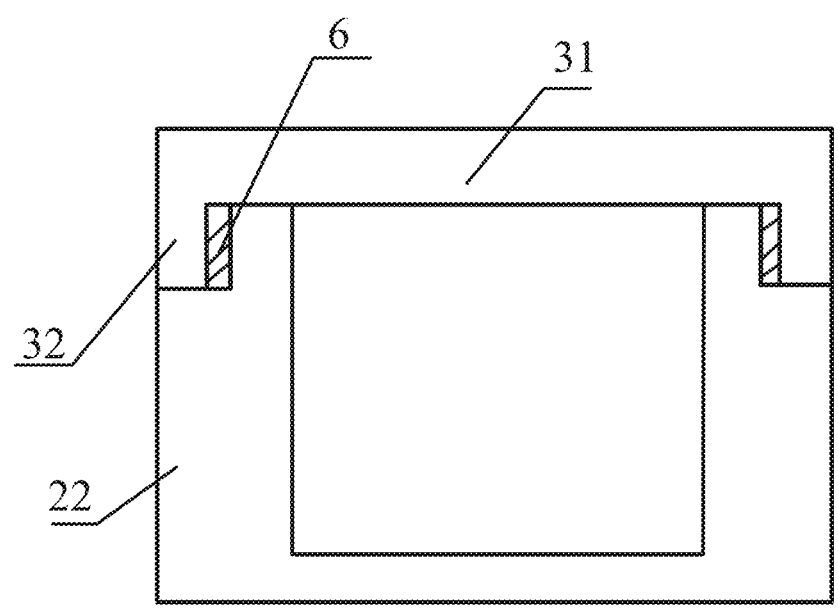
FIG. 18 is a schematic diagram of yet another optical sub-module, in accordance with some embodiments of the present disclosure.

In some other examples, as shown in FIGS. 14 and 18, the first sidewall 32 is disposed on the edge of the top wall 31, and the adhesive layer 6 is disposed between an inner surface of the first sidewall 32 and an outer surface of the second sidewall 22.

In this case, an encapsulation process of the first casing 3 and the second casing 2 is as follows. The top wall 31 is placed on the second sidewall 22, and the first sidewall 32 is located outside the cavity of the second casing 2, and the inner surface of the first sidewall 32 and the outer surface of the second sidewall 22 are bonded by the adhesive layer 6. The surface of the second sidewall 22 for bonding and the surface of the second sidewall 22 for supporting the first casing 3 are different surfaces.

In this way, the adhesive layer 6 is located outside the cavity of the second casing 2, which may prevent the adhesive of the adhesive layer 6 from flowing into the cavity and also prevent an uncontrollable flow of the adhesive from affecting the components or the optical path in the cavity.

Figure 15:
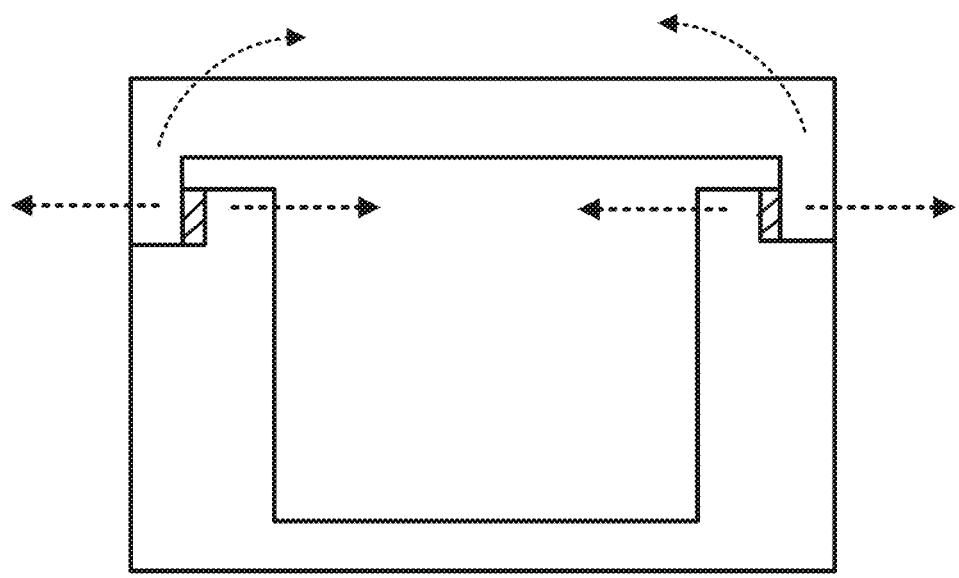
FIG. 15 is a schematic diagram showing forces to which the optical sub-module in FIG. 14 is subjected.

In this case, as shown in FIG. 15, when the adhesive layer 6 expands in a high temperature, since the coefficient of thermal expansion of the adhesive layer 6 is greater than the coefficient of thermal expansion of the first casing 3 and the coefficient of thermal expansion of the second casing 2, the expanded adhesive layer 6 will generate extrusion forces in all directions. The extrusion force in a horizontal direction may deform the second casing 2 and/or the first casing 3. The second sidewall 22 of the second casing 2 will be subjected to an extrusion force pointing to the interior of the cavity, and the first sidewall 32 of the first casing 3 will be subjected to an extrusion force pointing to the outside of the cavity. In this case, the first casing 3 is more prone to deform under the force, and provides a space for the expanded adhesive layer 6 to release the extrusion force, thereby reducing the extrusion force to which the second casing 2 is subjected and reducing the deformation of the second casing 2. As a result, an impact of the deformation of the second casing 2 on a position of the optical device 4 is weakened, which is conductive to maintaining a preset optical path, and solving a problem of a reduction of the optical power.

In order to make the deformation of the first sidewall 32 of the first casing 3 not affect the structure of the top wall 31, the adhesive layer 6 may not be in contact with the top wall 31. For example, as shown in FIGS. 12 and 14, the surface of the top wall 31 facing the second casing 2 and an end face of the second sidewall 22 facing the top wall 31 are spaced apart, so that the top wall 31 is not in contact with the adhesive layer 6. The adhesive layer 6 may not generate stress or generate little stress on the top wall 31 when the adhesive layer 6 expands.

In some other examples, as shown in FIGS. 12 and 14, the surface of the top wall 31 facing the second casing 2 and an end face of the adhesive layer 6 facing the first casing 3 are spaced apart. That is, an area of the first sidewall 32 coated with the adhesive layer 6 is less than a total area of the first sidewall 32, so that the adhesive layer 6 does not fully cover the first sidewall 32. That is, a portion of the first sidewall 32 proximate to the top wall 31 does not contact the adhesive layer 6, or the adhesive layer 6 does not contact the top wall 31. As a result, when the adhesive layer 6 expands, the stress to which the first sidewall 32 is subjected may be greater than the stress to which the top wall 31 is subjected, making the first sidewall 32 more deformable than the top wall 31.

As shown in FIG. 3, the optical device 4 is disposed in the cavity of the second casing 2 and fixedly connected to the second casing 2. For example, the optical device 4 is fixed on a bottom surface of the second casing 2. The optical device 4 may be directly fixed on the bottom surface of the second casing 2 or may be indirectly fixed on the bottom surface of the second casing 2. For example, the optical sub-module further includes a base disposed on the bottom surface of the second casing 2, and the optical device 4 is disposed on the base.

The optical device 4 includes, for example, an optical multiplexer/de-multiplexer, an optical lens, and an optical chip (a laser chip or an optical receiver chip). The optical components such as the optical multiplexer/de-multiplexer, the optical chip (the laser chip or the optical receiver chip), and the optical lens are disposed on the bottom wall 21 of the second casing 2.

The optical device 4 is connected to an external optical fiber to achieve optical transmission. In order to achieve the connection, as shown in FIGS. 3 and 8, the optical sub-module further includes at least one optical fiber port 7 disposed in the second sidewall 22 of the second casing 2. The optical fiber port 7 includes an optical fiber socket configured to receive and/or couple an optical fiber plug. Alternatively, the optical fiber port 7 includes an optical fiber plug configured to receive and/or couple an optical fiber socket. In this way, the optical device 4 and the external optical fiber can be connected.

In some examples, the optical chip includes the laser chip. In this case, the light emitted by the laser chip enters the optical fiber through the optical multiplexer/de-multiplexer and/or the optical lens, the optical fiber socket and the optical fiber plug.

In some other examples, the optical chip includes the optical receiver chip. In this case, the light transmitted from the optical fiber passes through the optical fiber plug, the optical fiber socket, the optical multiplexer/de-multiplexer and/or the optical lens, and is received by the optical receiver chip.

In some examples, as shown in FIGS. 3 and 8, an opening 8 is disposed in a portion of the second sidewall 22 of the second casing 2 that is opposite to or approximate to the portion of the second sidewall 22 where the optical fiber socket is located, and the opening 8 is configured to allow the circuit board 500 to pass through so that the circuit board 500 can be inserted into the second casing 2. Components on the circuit board 500 may be connected to an external power supply and a host computer, so as to achieve power supply and electrical signal transmission for the laser chip and the like.

As shown in FIG. 8, for example, a wire bonding escape groove 9 is disposed in the inner surface of the second sidewall 22 of the second casing 2 adjacent to the opening 8. The wire bonding escape groove 9 is configured to reserve an operation space, so that a gold wire can be connected to the circuit board 500 subsequently.

In addition, as shown in FIG. 8, for example, the optical sub-module further includes a positioning protrusion 41 disposed on the inner surface of a portion of the second sidewall 22 of the second casing 2 approximate to the optical fiber port 7 (e.g., a side sub-wall of the second sidewall 22 of the second casing 2 that is adjacent to the sub-wall where the optical fiber port 7 is located), and the positioning protrusion 41 is configured to position the optical device 4.

The structure of the first casing 3 is exemplarily described below.

In some embodiments, as shown in FIG. 5, the first sidewall 32 includes a first side sub-wall 321, a second side sub-wall 322, a third side sub-wall 323 and a fourth side sub-wall 324 connected sequentially in the circumferential direction. The first side sub-wall 321 and the third side sub-wall 323 are disposed at two opposite ends of the top wall 31, and the second side sub-wall 322 and the fourth side sub-wall 324 are disposed at another two opposite ends of the top wall 31. The first side sub-wall 321 the second side sub-wall 322, the third side sub-wall 323, and the fourth side sub-wall 324 are perpendicular to the top wall 31. Two adjacent side sub-walls are perpendicular to each other, and two opposite side sub-walls are parallel to each other. The first side sub-wall 321, the second side sub-wall 322, the third side sub-wall 323, the fourth side sub-wall 324 and the top wall 31 constitute the first casing 3 with the groove structure.

In a case where the first casing 3 and the second casing 2 are connected, the first side sub-wall 321, the second side sub-wall 322, the third side sub-wall 323 and the fourth side sub-wall 324 are connected to the second sidewall 22 of the second casing 2 through the adhesive layer 6, so as to form the chamber.

In some embodiments, in the process of connecting the first casing 3 and the second casing 2 through the adhesive layer 6, in order to reduce a risk that the first casing 3 and the second casing 2 deviate from a preset bonding position, and in order to reduce an alignment and bonding difficulty between the first casing 3 and the second casing 2, a positioning structure is disposed between the second sidewall 22 and the first sidewall 32. The positioning structure is configured to prevent the first casing 3 from moving in a direction proximate to the second casing 2, so as to form a preliminary positioning between the first casing 3 and the second casing 2, thereby reducing the alignment and bonding difficulty between the first casing 3 and the second casing 2, and reducing a risk that the first casing 3 and the second casing 2 deviate from the preset bonding position.

It will be understood that the positioning structure between the second sidewall 22 and the first sidewall 32 has multiple implementations, and the positioning structure provided by some embodiments of the present disclosure will be described in detail below with reference to FIGS. 6 to 8, 14, and 18.

Figure 7:
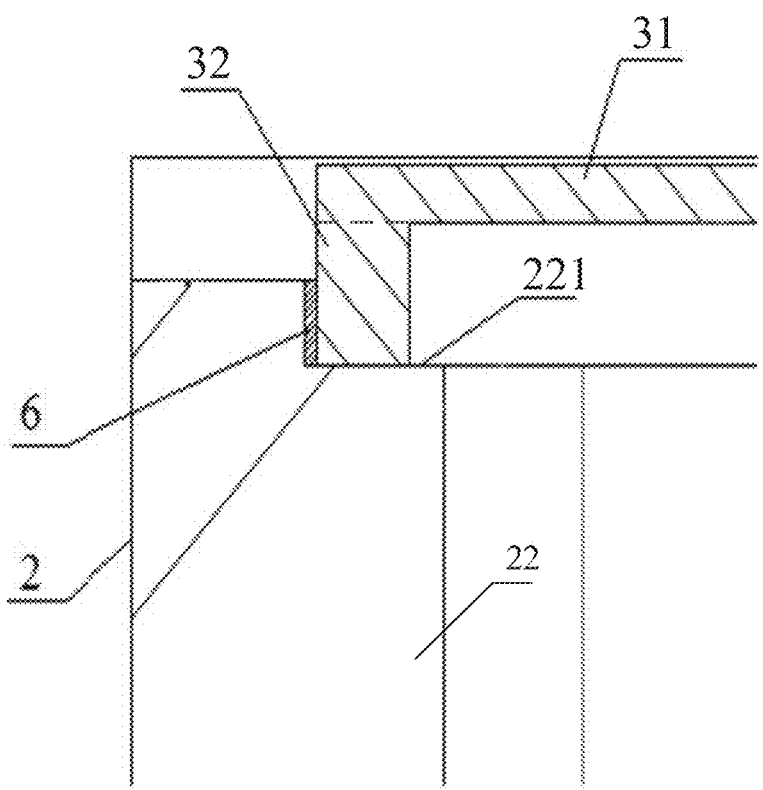
FIG. 7 is a diagram showing how parts of the optical sub-module in FIG. 6 are fitted together.

FIG. 6 is a partially exploded view of an optical sub-module, in accordance with some embodiments; FIG. 7 is a diagram showing how parts of the optical sub-module in FIG. 6 are fitted together; FIG. 8 is an upper perspective view of a second casing, in accordance with some embodiments; and FIGS. 14 and 18 are schematic diagrams of an optical sub-module, in accordance with some embodiments.

As shown in FIGS. 6 to 8, 14 and 18, the second sidewall 22 has at least one step 221 at its end proximate to the first casing 3, and the step 221 may be defined by the outer surface of the second sidewall 22 or the inner surface of the second sidewall 22.

For example, as shown in FIGS. 6 and 8, the step 221 is defined by the inner surface, and the step 221 has a first surface 2210 parallel to the end face of the second sidewall 22 facing the first casing 3 and a second surface 2211 perpendicular to the first surface 2210. The first surface 2210 of the step 221 is in contact with the end face of the first sidewall 32 facing the bottom wall 21, and the adhesive layer 6 is disposed between the second surface 2211 of the step 221 and the first sidewall 32. That is, the first surface 2210 of the step 221 is configured to support the first casing 3, and the second surface 2211 of the step 221 is bonded to the first sidewall 32 through the adhesive layer 6. The at least one step 221 may include four steps 221 each formed in a respective sub-wall of the second sidewall 22. Alternatively, the at least one step 221 may include steps 221 formed in some of the sub-walls of the second sidewall 22.

A structure of the second casing 2 is exemplarily described below.

In some embodiments, as shown in FIGS. 3 and 8, the second sidewall 22 includes a fifth side sub-wall 222, a sixth side sub-wall 223, a seventh side sub-wall 224, and an eighth side sub-wall 225 connected sequentially in the circumferential direction. The fifth side sub-wall 222 and the seventh side sub-wall 224 are disposed at two opposite ends of the bottom wall 21, and the sixth side sub-wall 223 and the eighth side sub-wall 225 are disposed at another two opposite ends of the bottom wall 21. The fifth side sub-wall 222, the sixth side sub-wall 223, the seventh side sub-wall 224, and the eighth side sub-wall 225 are perpendicular to the bottom wall 21. The fifth side sub-wall 222, the sixth side sub-wall 223, the seventh side sub-wall 224, the eighth side sub-wall 225 and the bottom wall 21 constitute the second casing 2 having the cavity.

For example, the sixth side sub-wall 223 is provided with the optical fiber port 7, the eighth side sub-wall 225 is provided with the opening 8, and the fifth side sub-wall 222 is provided with the wire bonding escape groove 9 and the positioning protrusion 41 for positioning the optical device 4 in FIG. 3 in the horizontal direction.

Herein, a height of the sixth side sub-wall 223 in a thickness direction of the bottom wall 21 is greater than a height of the fifth side sub-wall 222 and a height of the seventh side sub-wall 224 in the thickness direction of the bottom wall 21. The height of the fifth side sub-wall 222 in the thickness direction of the bottom wall 21 is approximately equal to the height of the seventh side sub-wall 224 in the thickness direction of the bottom wall 21. A height of the eighth side sub-wall 225 in the thickness direction of the bottom wall 21 is less than that the height of the fifth side sub-wall 222 in the thickness direction of the bottom wall 21.

As shown in FIG. 8, for example, each of ends of the fifth side sub-wall 222, the sixth side sub-wall 223 and the seventh side sub-wall 224 proximate to the first casing 3 has the step 221, and the steps 221 are defined by the inner surface of the second sidewall 22. The first surfaces 2210 of the steps 221 are in a same plane with an end face of the eighth side sub-wall 24 facing the first casing 3.

In some examples, after the first casing 3 and the second casing 2 are connected, an end face of the sixth side sub-wall 223 facing away from the bottom wall 21 is in a same plane with a surface of the top wall 31 facing away from the bottom wall 21.

In a case where the first casing 3 and the second casing 2 are connected, the first side sub-wall 321 is in contact with the step 221 of the fifth side sub-wall 222, the second side sub-wall 322 is in contact with the step 221 of the sixth side sub-wall 223, the third side sub-wall 323 is in contact with the step 221 of the seventh side sub-wall 224, and the fourth side sub-wall 324 is in contact with the eighth side sub-wall 225. The first side sub-wall 321 is connected to the fifth sub-wall 222 through the adhesive layer 6, and the second side sub-wall 322 is connected to the sixth side sub-wall 223 through the adhesive layer 6, the third side sub-wall 323 is connected to the seventh side sub-wall 224 through the adhesive layer 6, and the fourth side sub-wall 324 is connected to the eighth side sub-wall 225 through the adhesive layer 6. As a result, the groove structure of the first casing 3 is combined with the cavity structure of the second casing 2 to form the chamber, which may increase the accommodation space of the optical sub-module.

In some other examples, the at least one step 221 may also be defined by the outer surface of the second sidewall 22. For example, as shown in FIGS. 14 and 18, the step 221 has a first surface 2212 parallel to the end face of the second sidewall 22 facing the first casing 3 and a second surface 2213 perpendicular to the first surface 2212. The first surface 2212 of the step 221 is in contact with the end face of the first sidewall 32 facing the bottom wall 21, and the adhesive layer 6 is disposed between the second surface 2213 of the step 221 and the first sidewall 32. That is, the first surface 2212 of the step 221 is configured to support the first casing 3, and the second surface 2213 of the step 221 is bonded to the first sidewall 32 through the adhesive layer 6. The at least one step 221 may include four steps 221 each formed in a respective sub-wall of the second sidewall 22. Alternatively, the at least one step 221 may include steps 221 formed in some of the sub-walls of the second sidewall 22.

For example, as shown in FIGS. 14 and 18, in a case where the first casing 3 and the second casing 2 are connected by the adhesive layer 6, the second surfaces 2213 of the steps 221 are connected to the inner surfaces of the fifth side sub-wall 222, the sixth side sub-wall 223, the seventh side sub-wall 224 and/or the eighth side sub-wall 225. In an example where all the side sub-wall included in the second sidewall 22 are provided with a step 221, the adhesive is dripped between the second surfaces 2213 of the steps 221 and the inner surface of the first sidewall 32, so that the adhesive layer 6 is disposed between second surfaces 2213 of the steps 221 and the inner surface of the first sidewall 32. As a result, the steps 221 are connected to the first side sub-wall 321, the second side sub-wall 322, the third side sub-wall 323, and the fourth side sub-wall 324, thereby fixing the first casing 3 and the second casing 2 together.

In this case, the second casing 2 supports the first casing 3 through the steps 221 to form an initial position limit, which may be convenient for workers to operate and also reduce the risk that the first casing 3 and the second casing 2 deviate from the preset bonding position.

It will be understood that the first casing 3 and the second surface of the at least one step 221 are spaced apart, so as to facilitate dripping the adhesive for sealing, and to fix the first casing 3 and the second casing 2 through the adhesive layer 6. That is, a thickness of the adhesive layer 6 is related to a size of a preset gap between second surface of the step 221 and each side sub-wall of the first casing 3. In order to achieve the fixation without wasting the adhesive, the size of the preset gap between the second surface of the step 221 and a corresponding side sub-wall of the first casing 3 is in a range of approximately 0.05 mm to approximately 0.1 mm. That is, the thickness of the adhesive layer 6 is in a range of approximately 0.05 mm to approximately 0.1 mm. According to actual needs, the thickness of the adhesive layer 6 may be set as 0.05 mm, 0.06 mm, 0.07 mm, 0.08 mm, 0.09 mm, 0.1 mm, or the like.

In order to stably fix the first casing 3 to the at least one step 221, as shown in FIG. 6, a thickness of the first sidewall 32 is less than a width of the at least one step 221 in a thickness direction of the second sidewall 22. For example, a thickness H2 of the first sidewall 32 is approximately 60% to approximately 80% of a width H1 of the at least one step 221 in the thickness direction of the second sidewall 22.

For example, the thickness H2 of the first side sub-wall 321 is approximately 60% to approximately 80% of the width H1 of the corresponding step 221 in the thickness direction of the second sidewall 22. The thickness H2 of the first side sub-wall 321 is 60%, 65%, 70%, 75%, 80%, or the like of the width H1 of the corresponding step 221 in the thickness direction of the second sidewall 22.

In some embodiments, since the size of the overall optical sub-module limits the size of the first casing 3, in order to increase the volume of the chamber of the optical sub-module, the first casing 3 has a small thickness. A length and a width of the first casing 3 is determined according to the size of the second casing 2. In order to enable the first casing 3 to be deformed during baking in a high temperature, a thickness of the top wall 31 is less than a thickness of the first sidewall 32 under a premise of meeting normal use requirements. In some examples, as shown in FIG. 6, the thickness d1 of the top wall 31 is approximately 45% to approximately 55% of the thickness H2 of the first sidewall 32.

For example, the thickness d1 of the top wall 31 is approximately 45% to approximately 55% of the thickness H2 of the first side sub-wall 321. In a case that the first sidewall 32 can support the top wall 31, and can bear forces applied by the second casing 2 and the top wall 31, the thickness of the first side sub-wall 321 is greater than the thickness of the top wall 31. For example, the thickness d1 of the top wall 31 is 45%, 50%, 55%, or the like of the thickness H2 of the first side sub-wall 321.

Figure 16:
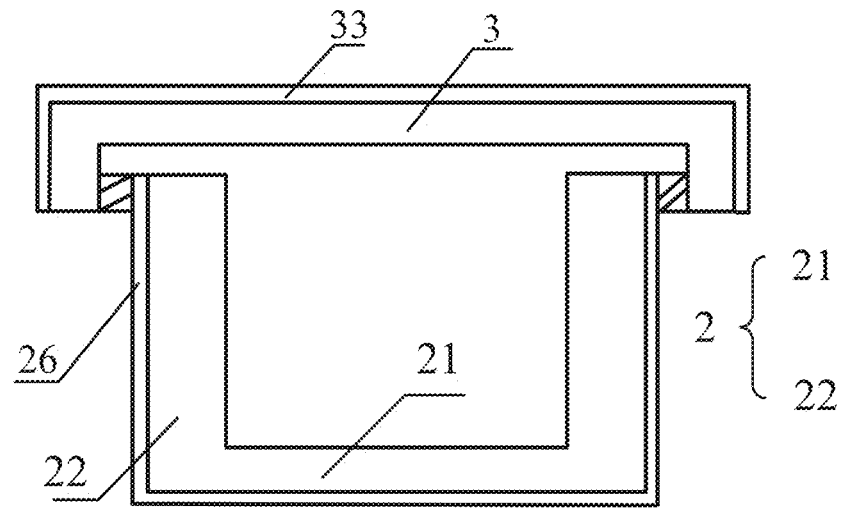
FIG. 16 is a schematic diagram of another first casing, in accordance with some embodiments of the present disclosure.

In some embodiments, as shown in FIG. 16, in order to improve a service life of the first casing 3 and avoid corrosion, the optical sub-module 300 further includes an anticorrosive layer 33 disposed on the outer surface of the first casing 3. An anticorrosive material, such as nickel, is coated on the outer surface of the first casing 3 through an electroplated manner. Of course, the optical sub-module 300 may further include an anticorrosive layer 26 disposed on the outer surface of second casing 2.

In order to illustrate beneficial effects of the optical sub-module 300 provided by the embodiments of the present disclosure more clearly, a simulation comparison between the optical sub-module 300 provided by the embodiments of the present disclosure and a reference optical sub-module is described below.

Figure 9A:
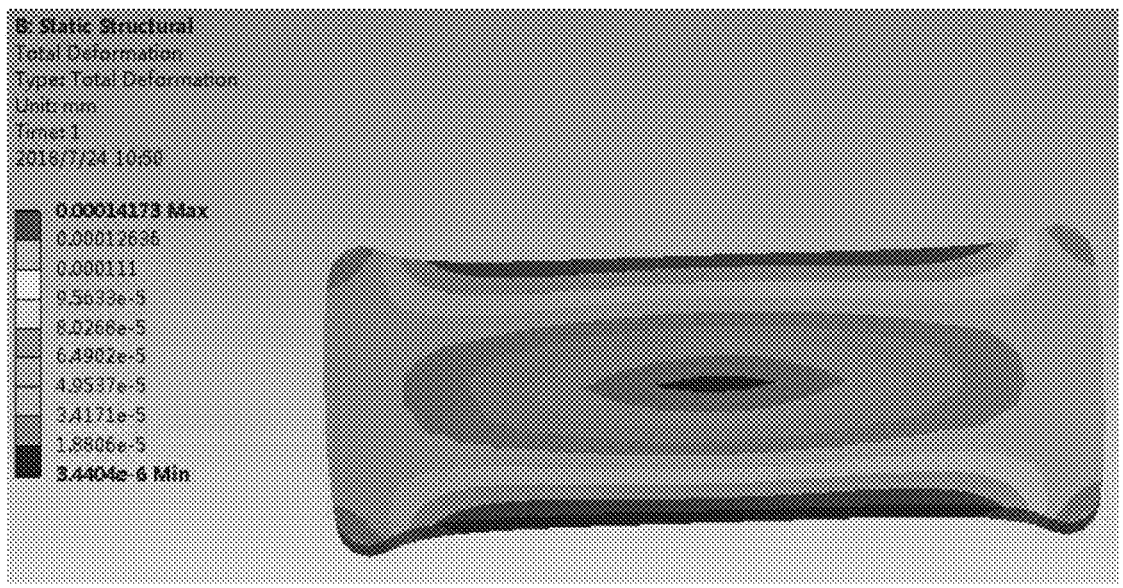
FIGS. 9A and 9B are diagrams showing simulation results of a reference optical sub-module.
Figure 9B:
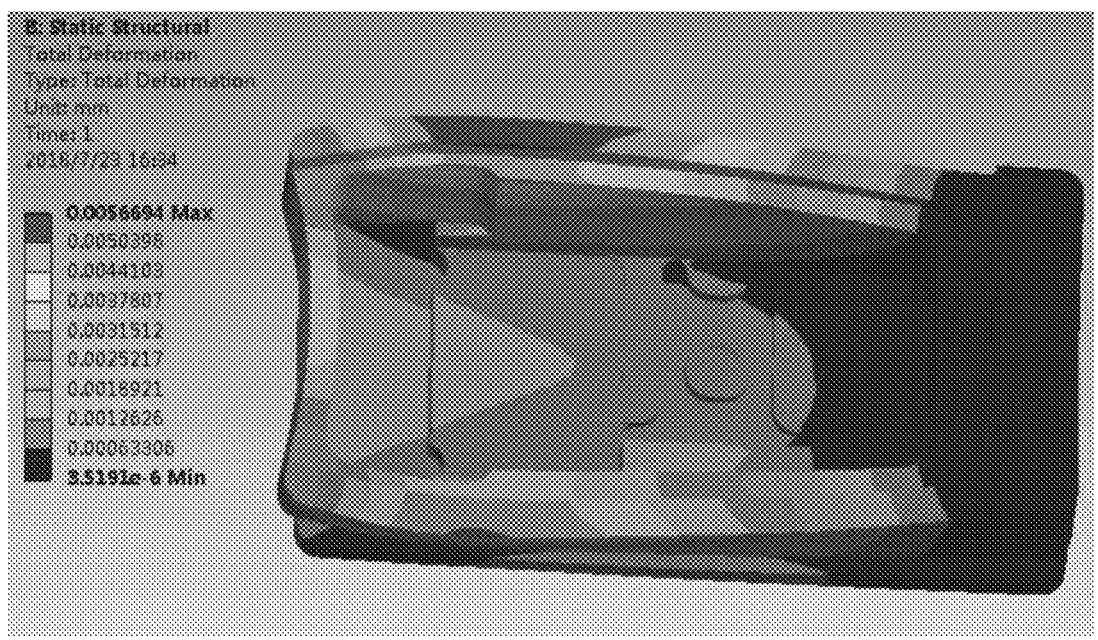
Figure 10A:
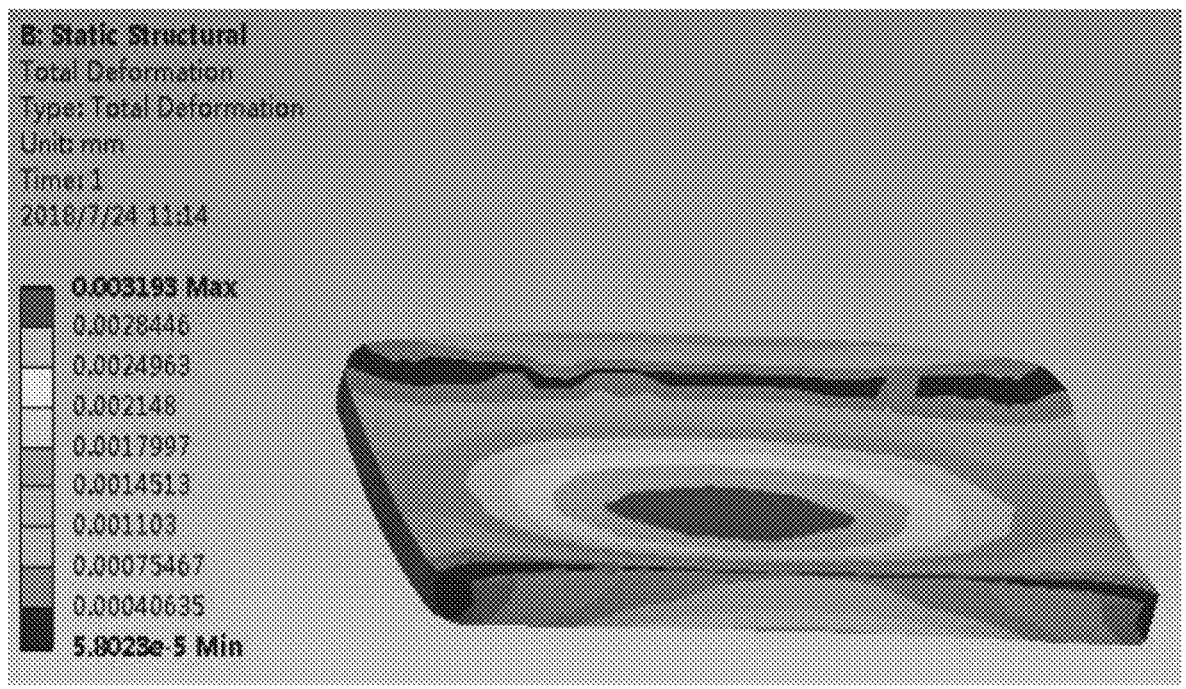
FIGS. 10A and 10B are diagrams showing simulation results of an optical sub-module, in accordance with some embodiments of the present disclosure.
Figure 10B:
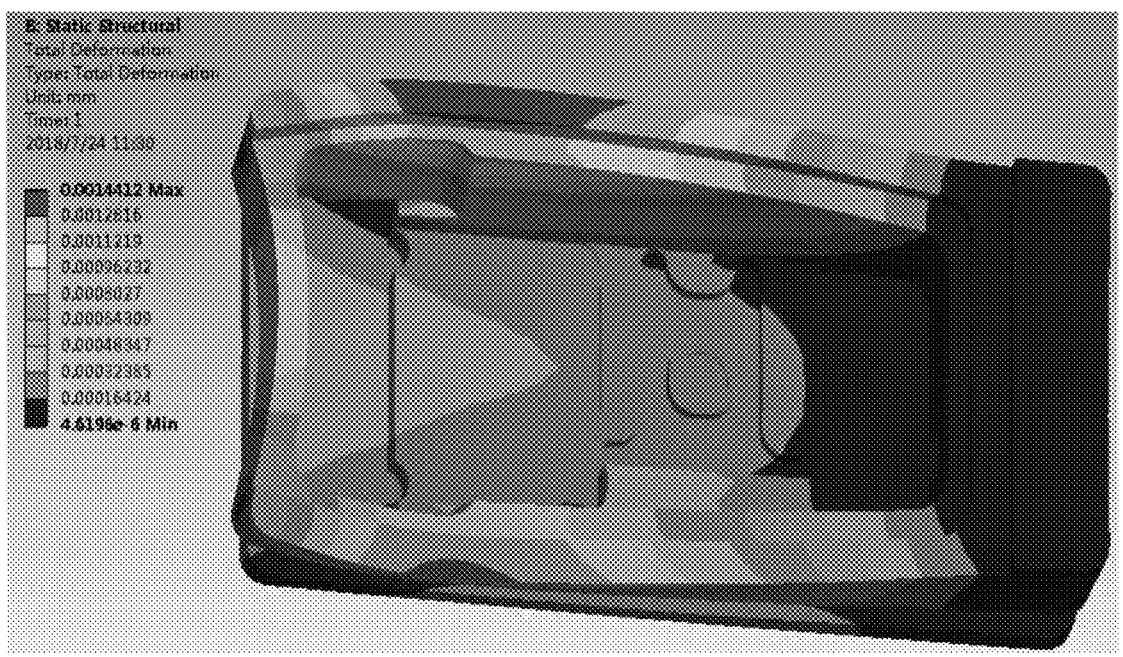

FIGS. 9A and 9B are diagrams showing simulation results of a reference optical sub-module as shown in FIG. 1 and FIGS. 10A and 10B are diagrams showing simulation results of an optical sub-module according to some embodiments of the present disclosure.

As shown in FIGS. 9A, 9B, 10A and 10B, according to a comparison between the simulation results of the reference optical sub-module and the simulation results of the optical sub-module 300 in the some embodiments the present disclosure, a maximum amount of deformation of the cover 3' of the reference optical sub-module is 0.14 μm, and a maximum amount of deformation of the shell 2' is 5.6 μm after being subjected to extrusion forces generated by a same adhesive. That is to say, the shell 2' is the one that mainly absorbs a strain, and the shell 2' deforms, thereby causing the optical path to be changed, affecting a stability of the optical path. In the optical sub-module 300 of the some embodiments of the present disclosure, the maximum amount of the deformation of the first casing 3 is 3.19 um, and the maximum amount of the deformation of the second casing 2 is 1.44 um. That is to say, the first casing 3 with the groove structure is the one that mainly absorbs the strain, and the deformation amount of the second casing 2 is less than the first casing 3. The deformation of the second casing 2 provided by the embodiments of the present disclosure is reduced by approximately four times, thereby reducing the impact on the stability of the optical path and making an optical performance of the optical module more stable.

It will be noted that, in the optical sub-module 300 in the some embodiments of the present disclosure, a metal substrate inside the optical sub-module 300 is removed to reduce the space of the overall structure. In this case, the first casing 3 of the optical sub-module 300 is a first casing with a groove structure, which may effectively absorb the stress, and make the optical path not be influenced by stress deformation, thereby simplifying a manufacturing process and having more advantages for the stability of the optical path.

In some examples, as shown in FIGS. 8 and 11, the circuit board 500 is connected to the optical sub-module 300 through the opening 8. The optical sub-module 300 and the circuit board 500 are enclosed in a chamber formed by a cover 100 and a housing 200.

In some embodiments, referring to FIG. 11, the optical module further includes a filter device 400. The filter device 400 is configured to receive an optical signal from the outside and preprocess the optical signal. For example, the filter device 400 filters out an interference signal from the optical signal, or as for a specific optical signal that can be processed by an optical chip, the filter device 400 filters out remaining non-specific optical signals to ensure that the optical signal that is input to the optical chip includes valid information.

Herein, the circuit board 500 is electrically connected to an external host computer to realize power supply and electrical signal transmission. The optical sub-module 300 is connected to a light medium such as an external optical fiber to realize optical transmission. That is, the optical module may play a role of photoelectric conversion. A transmitting end converts an electrical signal into an optical signal, and a receiving end converts the optical signal into an electrical signal after the transmission through the optical fiber.

The circuit board 500 may be a printed circuit board (PCB).

The above descriptions are merely some embodiments of the present disclosure and are not intended to limit the present disclosure. Any modification, equivalent replacement, or improvement made within spirits and principles of the present disclosure shall be included in the protection scope of the present disclosure.

What is claimed is:

1. An optical sub-module, comprising:
a first casing having a top wall and a first sidewall;
a second casing having a bottom wall and a second sidewall, wherein a height of the second sidewall in a thickness direction of the bottom wall is greater than a height of the first sidewall in a thickness direction of the top wall, and the second casing is connected to the first casing to form a chamber;
an adhesive layer disposed between a surface of the first sidewall and a surface of the second sidewall that are opposite to each other, wherein a coefficient of thermal expansion of the adhesive layer is greater than a coefficient of thermal expansion of the first casing and a coefficient of thermal expansion of the second casing; and
an optical device disposed in the chamber and fixedly connected to the second casing.

2. The optical sub-module according to claim 1, wherein stiffness of the first casing is less than stiffness of the second casing.

3. The optical sub-module according to claim 1, wherein the coefficient of thermal expansion of the first casing is less than the coefficient of thermal expansion of the second casing.

4. The optical sub-module according to claim 1, wherein yield strength of the first casing is less than yield strength of the second casing.

5. The optical sub-module according to claim 1, wherein a surface of the top wall facing the second casing and an end face of the second sidewall facing the top wall are spaced apart.

6. The optical sub-module according to claim 1, wherein a surface of the top wall facing the second casing and an end face of the adhesive layer facing the top wall are spaced apart.

7. The optical sub-module according to claim 1, further comprising a positioning structure disposed on an end portion of the second sidewall adjacent to the first sidewall, wherein the positioning structure is configured to prevent the first casing from moving in a direction pointing to the second casing.

8. The optical sub-module according to claim 7, wherein the positioning structure includes at least one step provided in the end portion of the second sidewall adjacent to the first casing and defined by an inner surface of the second sidewall or an outer surface of the second sidewall; each step includes a first surface parallel to the bottom wall and a second surface perpendicular to the first surface, and the first surface of the step is in contact with an end face of the first sidewall facing the bottom wall, and the adhesive layer is disposed between the second surface of the step and the first sidewall.

9. The optical sub-module according to claim 8, wherein a thickness of the first sidewall is approximately 60% to approximately 80% of a thickness of the at least one step in a thickness direction of the second sidewall.

10. The optical sub-module according to claim 1, wherein a thickness of the top wall is less than a thickness of the first sidewall.

11. The optical sub-module according to claim 10, wherein the thickness of the top wall is approximately 45% to approximately 55% of the thickness of the first sidewall.

12. The optical sub-module according to claim 1, wherein the first sidewall includes a first side sub-wall, a second side sub-wall, a third side sub-wall and a fourth side sub-wall; the first side sub-wall and the third side sub-wall are disposed at two opposite ends of the top wall, and the second side sub-wall and the fourth side sub-wall are disposed at another two opposite ends of the top wall; the first side sub-wall, the second side sub-wall, the third side sub-wall and the fourth side sub-wall are perpendicular to the top wall; and the first side sub-wall, the third side sub-wall, the second side sub-wall and the fourth side sub-wall are sequentially connected.

13. The optical sub-module according to claim 1, wherein the adhesive layer is disposed between an outer surface of the first sidewall and an inner surface of the second sidewall.

14. The optical sub-module according to claim 1, wherein the adhesive layer is disposed between an inner surface of the first sidewall and an outer surface of the second sidewall.

15. The optical sub-module according to claim 1, wherein a thickness of the adhesive layer is in a range of approximately 0.05 mm to approximately 0.1 mm.

16. The optical sub-module according to claim 1, further comprising an anticorrosive layer, wherein the anticorrosive layer is disposed on an outer surface of the first casing and/or an outer surface of the second casing.

17. The optical sub-module according to claim 1, wherein the top wall and the first sidewall are one integral piece.

18. The optical sub-module according to claim 1, wherein the top wall is fixedly connected to the first sidewall.

19. An optical module, comprising a circuit board and the optical sub-module according to claim 1, the optical sub-module being electrically connected to the circuit board.

* * * * *